(12) United States Patent
Isono

(10) Patent No.: US 8,052,400 B2
(45) Date of Patent: Nov. 8, 2011

(54) AIR SUPPLY APPARATUS

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 793 days.

(21) Appl. No.: 12/095,254

(22) PCT Filed: Dec. 15, 2006

(86) PCT No.: PCT/JP2006/325574
§ 371 (c)(1),
(2), (4) Date: May 28, 2008

(87) PCT Pub. No.: WO2007/077755
PCT Pub. Date: Jul. 12, 2007

(65) Prior Publication Data
US 2009/0311112 A1    Dec. 17, 2009

(30) Foreign Application Priority Data

Dec. 28, 2005   (JP) .................................. 2005-377994

(51) Int. Cl.
*F04B 17/06*   (2006.01)
*F04B 35/06*   (2006.01)
*B60C 23/12*   (2006.01)

(52) U.S. Cl. .................... 417/233; 152/417; 152/419

(58) Field of Classification Search .................. 152/418, 152/419, 415–417; 417/233; 137/224; 73/146.3; 340/442
See application file for complete search history.

(56) References Cited

U.S. PATENT DOCUMENTS

| | | | |
|---|---|---|---|
| 1,584,934 A * | 5/1926 | Harris ........................... | 137/225 |
| 2,415,618 A | 2/1947 | West | |
| 3,927,708 A | 12/1975 | Hulme | |
| 4,765,385 A * | 8/1988 | McGeachy ................... | 152/416 |
| 5,342,177 A | 8/1994 | Cheng | |
| 5,947,696 A | 9/1999 | Baumgarten | |
| 2005/0000587 A1 * | 1/2005 | Nakano .......................... | 141/38 |
| 2005/0081973 A1 * | 4/2005 | Marin-Martinod ........... | 152/415 |

FOREIGN PATENT DOCUMENTS

| | | |
|---|---|---|
| JP | 61 66001 | 5/1986 |
| JP | 62 4617 | 1/1987 |
| JP | 1 172003 | 7/1989 |
| JP | 7 69017 | 3/1995 |
| JP | 11 139118 | 5/1999 |
| JP | 11 509157 | 8/1999 |
| JP | 2003 341320 | 12/2003 |
| JP | 2004 155279 | 6/2004 |
| JP | 2005 53343 | 3/2005 |
| WO | 00 76793 | 12/2000 |
| WO | 01 81105 | 11/2001 |
| WO | 03 66354 | 8/2003 |
| WO | 2006 107064 | 10/2006 |

* cited by examiner

*Primary Examiner* — Devon C Kramer
*Assistant Examiner* — Bryan Lettman
(74) *Attorney, Agent, or Firm* — Oblon, Spivak, McClelland, Maier & Neustadt, L.L.P.

(57) ABSTRACT

An air supply apparatus (A) includes an air pump capable of supplying compressed air to an air chamber (a tire air chamber (Ra) of a wheel (B)) on the basis of rotation of the wheel (B); a change valve provided outside a pump chamber (Ro) of the air pump and adapted to restrict the supply of compressed air from the pump chamber (Ro) to the air chamber when the pressure of compressed air supplied from the pump chamber (Ro) to the air chamber reaches a first set value; and an adjustor capable of adjusting the first set value.

16 Claims, 3 Drawing Sheets

AIR SUPPLY APPARATUS

TECHNICAL FIELD

The present invention relates to an air supply apparatus, and more particularly, to an air supply apparatus which is driven by rotation of a wheel and can supply compressed air to an air chamber such as a tire air chamber of the wheel or a pressure accumulation chamber of an accumulator capable of supplying compressed air to the tire air chamber.

BACKGROUND ART

An air supply apparatus of such a type is disclosed in, for example, Japanese Patent Application Laid-Open (kokai) No. 2003-341320. The air supply apparatus described in this publication includes an air pump capable of supplying compressed air to a tire air chamber of a wheel by making use of rotation of the wheel, and an adjustment screw for adjusting the maximum air pressure (target air pressure) of the tire air chamber.

DISCLOSURE OF THE INVENTION

Incidentally, in the air supply apparatus described in the above-mentioned publication, the adjustment screw is provided to adjust the maximum moving amount of the piston of the air pump, and the maximum air pressure (target air pressure) of the tire air chamber is adjusted through adjustment of the compression ratio of the air pump by means of the adjustment screw. Therefore, the discharge capacity of the air pump changes as a result of the adjustment of the maximum air pressure (target air pressure) of the tire air chamber.

The present invention has been achieved in order to cope with the above-described problem, and provides an air supply apparatus which comprises an air pump capable of supplying compressed air to an air chamber on the basis of rotation of a wheel; restriction means, provided outside a pump chamber of the air pump, for restricting the supply of compressed air from the pump chamber to the air chamber when the pressure of compressed air supplied from the pump chamber to the air chamber reaches a first set value; and adjustment means for adjusting the first set value.

In this air supply apparatus, the restriction means for restricting the supply of compressed air from the pump chamber of the air pump to the air chamber is provided outside the pump chamber of the air pump, and the timing (the first set value) at which the supply of compressed air from the pump chamber of the air pump to the air chamber is restricted can be adjusted by use of the adjustment means. Therefore, even when the above-described timing (the first set value) is adjusted by use of the adjustment means, the discharge capacity of the air pump does not change. Accordingly, it is possible to adjust the pressure of compressed air supplied to the air chamber to the target value (the first set value), without changing the discharge capacity of the air pump.

Further, when the present invention is embodied, a change valve may be used as the restriction means. When the pressure of compressed air supplied from the pump chamber to the air chamber is less than the first set value, the change valve restricts air flow from the pump chamber to the atmosphere, and permits air flow from the pump chamber into the air chamber; and when the pressure of compressed air supplied from the pump chamber to the air chamber is equal to or greater than the first set value, the change valve permits air flow between the pump chamber and the atmosphere, and restricts air flow between the pump chamber and the air chamber.

In this case, when the pressure of compressed air supplied from the pump chamber of the air pump to the air chamber is equal to or greater than the first set value, the change valve permits air flow between the pump chamber and the atmosphere. Therefore, the load required to drive the air pump can be reduced.

In this case, the change valve may include a valve body which is movably assembled to a passageway communicating with the pump chamber and the air chamber and controls air flow in accordance with a moved position; and a spring which has a movable end portion in engagement with the valve body and is capable of controlling the moved position of the valve body, wherein an urging force applied from the spring to the valve body is adjusted by the adjustment means. Further, the adjustment means may include a spring support for supporting a stationary end portion (an end portion which does not move even when the valve body moves) of the spring, and a screw mechanism for adjusting the position of the spring support.

In this case, the screw mechanism may include an adjustment screw which can advance and retreat and which is formed separately from the spring support. In this case, it is possible to rotate the adjustment screw in relation to the spring support, without transmitting rotation of the adjustment screw to the spring whose stationary end portion is supported by the spring support.

Further, the adjustment means may include a speed-changing mechanism capable of finely adjusting the position of the spring support. In this case, fine adjustment of the position of the spring support can be readily performed, and thus, the accuracy of adjustment by the adjustment means can be improved.

When the present invention is embodied, a relief valve may be provided. The relief valve releases compressed air to the atmosphere when the pressure of compressed air supplied from the pump chamber to the air chamber is equal to or greater than a second set value greater than the first set value. In this case, it is possible to prevent the pressure within the air chamber from becoming excessively high.

In this case, the relief valve may be set to operate only in a state in which the change valve permits air flow between the pump chamber and the atmosphere and restricts air flow between the pump chamber and the air chamber. This structure can eliminate useless operation of the relief valve.

Further, in this case, the relief valve may be disposed inside the change valve. In this case, the air supply apparatus can be made compact. Further, the adjustment means may be configured to adjust the first set value and the second set value simultaneously. In this case, the spring support supporting the stationary end portion of the spring, which is a component of the change valve, and another spring support supporting the stationary end portion of a spring, which is a component of the relief valve, may be integrated together. In these cases, the first set value and the second set value can be adjusted simultaneously by the adjustment means, whereby the adjusting work can be simplified.

When the present invention is embodied, there may be provided detection means for converting position adjustment of the spring support into an electrical signal, the adjustment being performed by means of the screw mechanism. In this case, the detection means may be a stroke sensor which detects the position of the spring support. In these cases, the position of the spring support can be detected accurately. Further, the stroke sensor may be configured to use the spring support as a movable portion of the sensor. In this case the structure of the stroke sensor can be simplified.

When the present invention is embodied, the adjustment means may include an electrical actuator, whose operation is controlled by an electric controller. In this case, since the above-described set values can be adjusted by operating the electrical actuator, the adjustment work can be performed through remote operation.

When the present invention is embodied, the air pump, the restriction means, and the adjustment means may be coaxially disposed in relation to a rotation shaft which rotates together with the wheel. In this case, the restriction means may be disposed between the air pump and the adjustment means. In this case, air-tightness of the restriction means can be readily secured. Further, in this case, the adjustment means may be disposed at the furthest outboard position. In this case, the adjustment means can be operated easily, and thus, maintainability is improved.

Further, in this case, the air pump, the restriction means, and the adjustment means may be assembled to a hub which rotates together with the wheel, with a drive axle coupled to the inboard end of the hub such that torque can be transmitted from the drive axle to the hub. In this case, the air supply apparatus can be neatly assembled into the hub, which supports the wheel and rotates together with the wheel, whereby the hub can be utilized effectively.

BEST MODE FOR CARRYING OUT THE INVENTION

Figure 1:
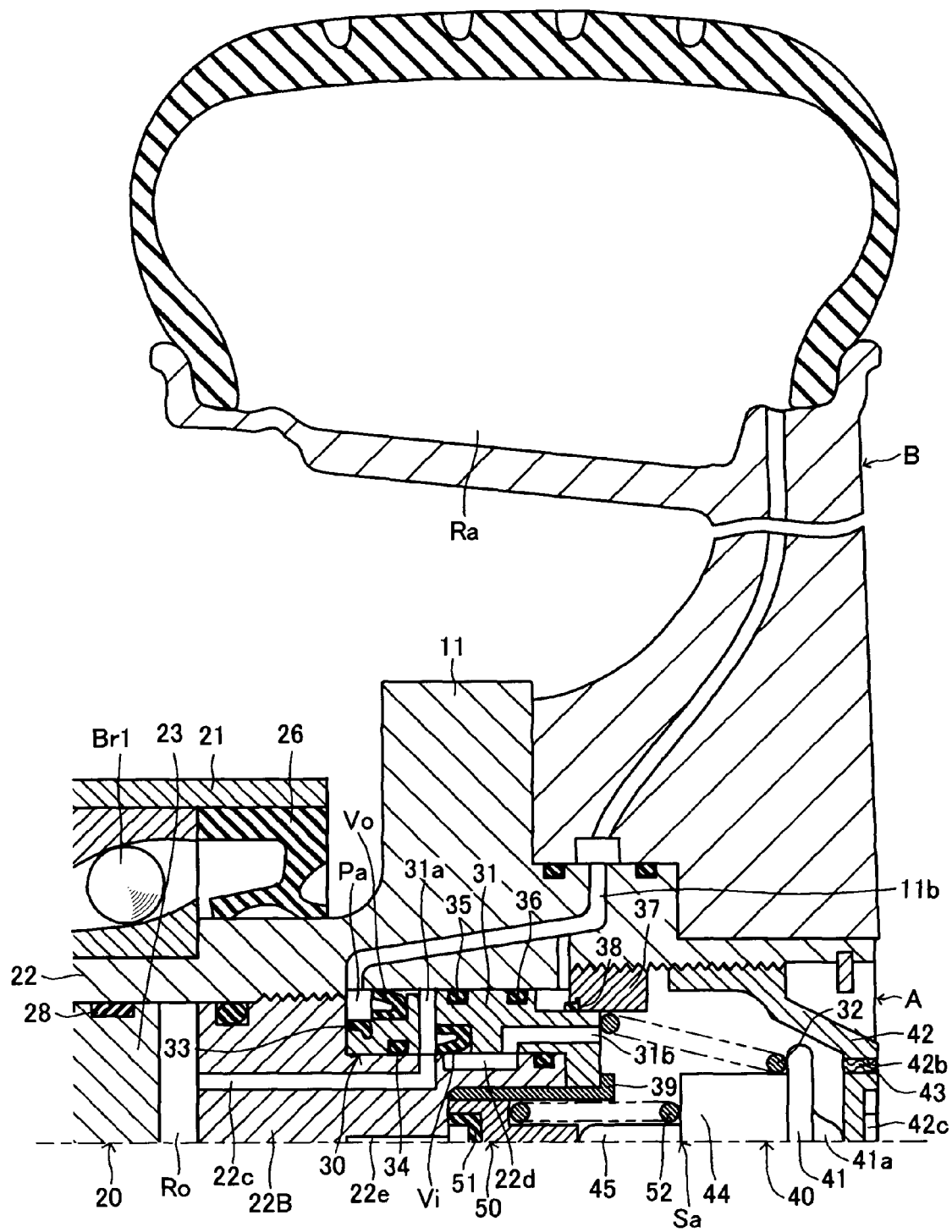
FIG. 1 is a sectional view showing one embodiment of an air supply apparatus according to the present invention.
Figure 2:
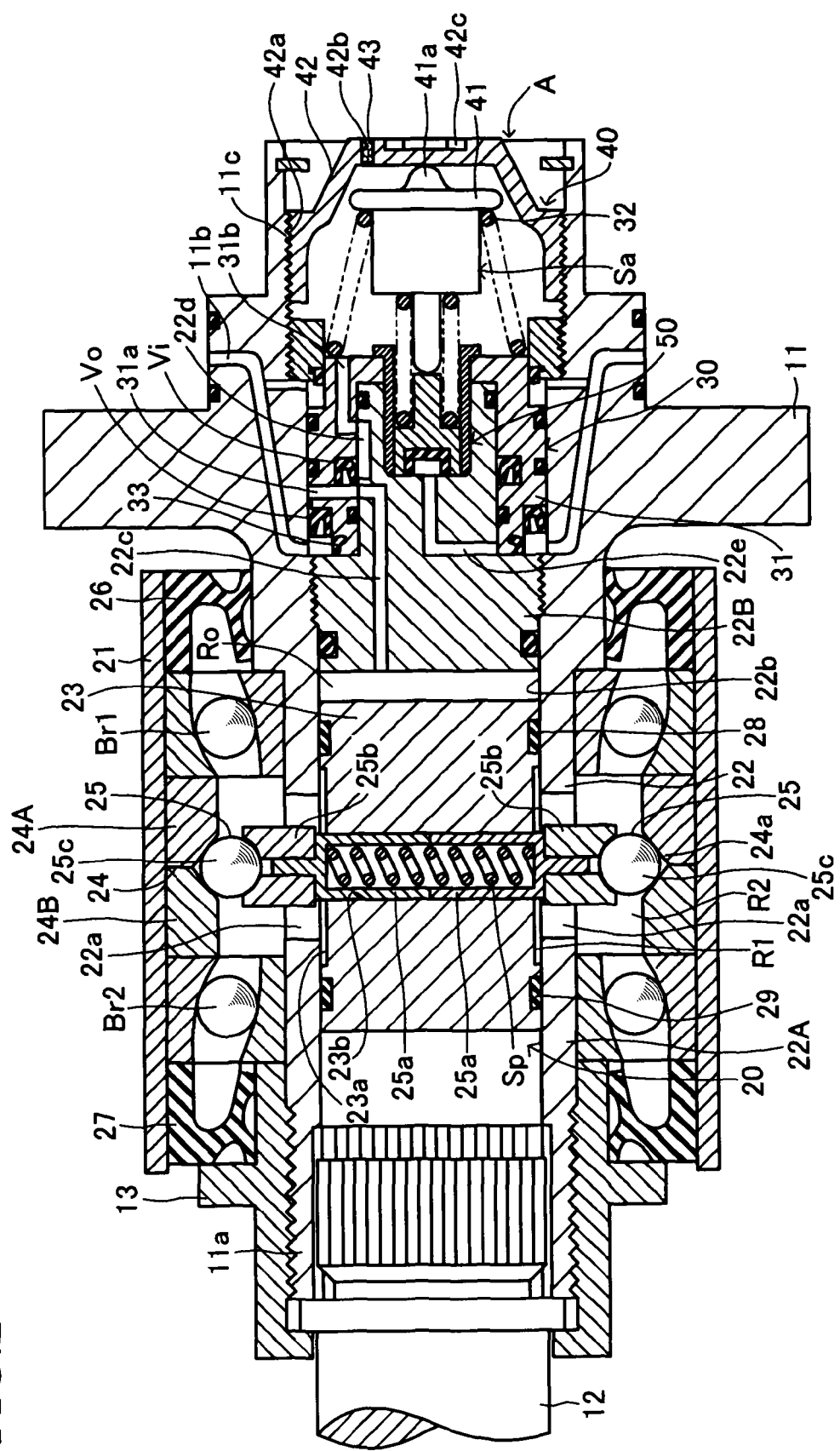
FIG. 2 is a sectional view showing the entirety of the air supply apparatus of FIG. 1.

An embodiment of the present invention will next be described with reference to the drawings. FIGS. 1 and 2 show an embodiment in which an air supply apparatus A of the present invention is assembled to a hub 11 which rotates with a wheel B. A drive axle 12 is splined to the inboard end of the hub 11, whereby the hub 11 and the drive axle 12 are connected for torque transmission. The connection between the hub 11 and the drive axle 12 is ensured by means of a lock nut 13.

The air supply apparatus A includes an air pump 20, a change valve 30, and an adjuster 40, which are coaxially disposed in a shaft portion (rotation shaft) 11a of the hub 11. The air supply apparatus A also includes a relief valve 50 coaxially disposed inside the change valve 30. Of the air pump 20, the change valve 30, and the adjuster 40, the air pump 20 is disposed at the furthest inboard position. The change valve 30 is disposed between the air pump 20 and the adjuster 40. Of the air pump 20, the change valve 30, and the adjuster 40, the adjuster 40 is disposed at the furthest outboard position.

The air pump 20 can supply compressed air, generated through rotation of the wheel B, to the tire air chamber Ra of the wheel B. The air pump 20 includes a nonrotatable cylindrical member 21; a rotatable cylinder 22 formed on the shaft portion 11a of the hub 11; a piston 23, which is a reciprocating body; a cam member 24; and a pair of cam followers 25.

The cylindrical member 21 is supported nonrotatably by a support member (not shown). The cylinder (hub) 22 is supported in the interior of the cylindrical member 21 rotatably about the axis of the wheel B and liquid-tightly via a pair of bearings Br1 and Br2 and a pair of annular seal members 26 and 27. The paired bearings Br1 and Br2 are spaced a predetermined distance apart from each other in the axial direction and intervene between the cylindrical member 21 and the cylinder 22 while sandwiching the cam member 24 therebetween in the axial direction, thereby enabling rotation of the cylinder 22 in relation to the cylindrical member 21. The paired annular seal members 26 and 27 are spaced a predetermined distance apart from each other in the axial direction and intervene between the cylindrical member 21 and the cylinder 22 while sandwiching the cam member 24 and the bearings Br1 and Br2 therebetween in the axial direction, thereby providing a liquid-tight seal between the cylindrical member 21 and the cylinder 22.

The cylinder 22 includes a cylinder body 22A and a cylinder head 22B, which is airtightly and screw-engaged with an outboard end portion of the cylinder body 22A. The cylinder body 22A has a pair of axially elongated holes 22a and a cylinder bore 22b extending in the axial direction. A suction-discharge path 22c, a communication path 22d, and a relief path 22e are formed in the cylinder head 22B. The paired axially elongated holes 22a collectively serve as guide means for guiding the piston 23 and the cam followers 25 in such a manner that these members are rotatable unitarily with the cylinder 22 and can reciprocate in the axial direction. The paired axially elongated holes 22a are spaced 180 degrees apart from each other in the circumferential direction of the cylinder 22.

The cylinder bore 22b accommodates the piston 23, and forms a pump chamber Ro in cooperation with the piston 23. The suction-discharge path 22c always communicates with a communication path 31a provided in a valve body 31 of the change valve 30. The suction-discharge path 22c can lead air into the pump chamber Ro through a suction check valve Vi attached to the valve body 31 of the change valve 30, and can lead air from the pump chamber Ro through a discharge check valve Vo attached to the valve body 31 of the change valve 30.

The communication path 22d always communicates with an atmosphere communication path 31b provided in the valve body 31 of the change valve 30. The communication between the communication path 22d and the communication path 31a provided in the valve body 31 of the change valve 30 can be established and cut off. The relief path 22e can be opened to the atmosphere or closed by the relief valve 50. The communication between the relief path 22e and a discharge path 11b formed in the hub 11 can be established and cut off by a seal member 33 assembled to the valve body 31 of the change valve 30.

The piston 23 is inserted into the cylinder bore 22b of the cylinder 22 via a pair of annular seal members 28 and 29 and is attached to the cylinder 22 in a unitarily rotatable manner and in such a manner as to be able to axially reciprocate. The piston 23 has an annular groove 23a and a radially extending through hole 23b. The paired annular seal members 28 and 29 are spaced a predetermined distance apart from each other in the axial direction and intervene between the piston 23 and the cylinder 22 at respective, axial end portions of the piston 23, thereby providing an airtight, liquid-tight seal between the piston 23 and the cylinder 22.

The annular groove 23a is formed on the outer circumference of the piston 23 between the paired annular seal members 28 and 29, whereby an annular space R1 is formed between the piston 23 and the cylinder 22. The annular space R1 communicates with an annular space R2 formed between the paired annular seal members 26 and 27, through the axially elongated holes 22a formed in the cylinder 22. The annular spaces R1 and R2 remain unchanged in volume during axial reciprocating motion of the piston 23 and are sealed by means of the four seal members 26, 27, 28, and 29. The annular spaces R1 and R2 and the like collectively serve as an oil chamber for accommodating a predetermined amount of lubrication oil. This oil chamber accommodates the bearings Br1 and Br2, the cam member 24, the cam followers 25, a compression coil spring Sp, and the like.

The cam member 24 consists of a pair of cam sleeves 24A and 24B, which are provided in contact with each other in the axial direction, and is attached unitarily (in an axially immovable manner and in a nonrotatable manner) to the cylindrical member 21. The cam member 24 is disposed coaxially with the cylinder 22. The cam member 24 has an annular cam portion 24a whose axial position varies. The cam portion 24a is a cam groove, into which a ball 25c of each cam follower 25 is fitted. The cam portion 24a has a cam face which receives a load along the axial direction (a load along the horizontal direction in the drawings) and a load along the radial direction (a load along the vertical direction in the drawings) from the ball 25c of the cam follower 25. This cam face has a V-shaped cross section and has an even number of geometric cycles (e.g., two geometric cycles) along the circumferential direction of the cylinder 22.

The cam followers 25 each include a shaft 25a divided into two pieces within the piston 23, and a roller 25b and the ball 25c attached to the shaft 25a. The shaft 25a of each of the cam followers 25 is installed in the through hole 23b of the piston 23 in such a manner as to be movable in a radial direction of the piston 23. The cam followers 25 each are engaged with the cam portion (cam groove) 24a of the cam member 24, at the end portion extending in the radial direction (that is, at the ball 25c). Through relative rotation in relation to the cam member 24, the cam followers 25 can move in the axial direction of the piston 23.

The shafts 25a each serve as a load transmission element, which is installed in the through hole 23b of the piston 23 in such a manner as to be movable in the radial direction of the piston 23 (the axial direction of the through hole 23b). The compression coil spring Sp installed within the shafts 25a urges the shafts 25a in a radially outward direction of the piston 23. The shafts 25a are support bodies which rotatably support the rollers 25b. The rollers 25b are rotatably supported at respective small-diameter end portions projecting from the through hole 23b of the piston 23.

While being rotatably fitted to the respective small-diameter end portions of the shafts 25a, the rollers 25b are rollably fitted into the respective axially elongated holes 22a of the cylinder 22. The rollers 25b can roll along the respective axially elongated holes 22a of the cylinder 22 in association with the axial movement of the cam followers 25. Each of the rollers 25b has a hemispherically recessed bearing portion at its axially outer end. The bearing portions of the rollers 25b rollably support the respective balls 25c.

Each of the balls 25c is a protruded portion of the cam follower 25, which is rollably supported by the roller 25b and is rollably engaged with the cam portion (cam groove) 24a of the cam member 24. Each of the balls 25c is subject to repulsion force of the compression coil spring Sp via the shaft 25a and the roller 25b, and is resiliently engaged with the cam portion (cam groove) 24a of the cam member 24 without clearance.

The compression coil spring Sp is a pressing means for pressing the balls 25c of the cam followers 25 in a radial direction of the piston 23 toward the cam portion (cam groove) 24a of the cam member 24. The compression coil spring Sp is installed in closed-bottomed mounting holes of the shafts 25a of the cam followers 25 under predetermined preload.

In the thus-configured air pump 20, when the cylinder 22 (the hub 11) rotates with the valve body 31 of the change valve 30 maintained in the illustrated position, the piston 23 and the cam followers 25 rotate unitarily with the cylinder 22 and undergo relative rotation in relation to the cam member 24 to thereby move axially. Accordingly, the rotary motion of the cylinder 22 can be converted to the reciprocating motion of the piston 23. The reciprocating motion of the piston 23 can increase and decrease the volume of the pump chamber Ro. Thus, air can be introduced into the pump chamber Ro through the suction check valve Vi and the suction-discharge path 22c. Also, air can be discharged from the pump chamber Ro through the suction-discharge path 22c and the discharge check valve Vo.

The change valve 30 is provided outside the pump chamber Ro of the air pump 20, and serves as restriction means for restricting the supply of compressed air from the pump chamber Ro to the tire air chamber Ra when the pressure of the compressed air supplied from the pump chamber Ro to the tire air chamber Ra reaches a first set value P1. The change valve 30 includes the valve body 31 and a compression coil spring 32. The valve body 31 is movably assembled to a passageway Pa formed between the hub 11 and the cylinder head 22B and communicating with the pump chamber Ro and the tire air chamber Ra, and controls the flow of air in accordance with the moved position. The compression coil spring 32 is engaged with the valve body 31 at its one end portion (a movable end portion which moves when the valve body 31 moves in the axial direction), and is capable of controlling the moving timing and moved position of the valve body 31. The adjuster 40 can adjust the urging force applied to the valve body 31 by the compression coil spring 32.

The valve body 31 has the above-described communication path 31a and atmosphere communication path 31b. The above-described suction check valve Vi and discharge check valve Vo are assembled to the valve body 31. Moreover, annular seal members 33, 34, 35, and 36 are assembled to the valve body 31, and an annular seal member 38 is assembled to the inner circumference of an inner end portion of a sleeve (stopper) 37 screwed to the hub 11. Thus, the pressure of compressed air supplied from the pump chamber Ro to the tire air chamber Ra acts via the discharge path 11b of the hub 11 on the outer circumference of a larger-diameter end portion (the outer circumference of an inboard end portion) of the valve body 31, and also acts on a shoulder portion (a shoulder portion formed at an outboard end portion) of the valve body 31, whereby the valve body 31 can move against the urging force of the compression coil spring 32. Notably, the atmosphere communication path 31b always communicates with the atmosphere via an atmosphere communication path 42b formed in an adjustment screw 42 of the adjuster 40.

In the change valve 30, when the pressure of compressed air supplied from the pump chamber Ro to the tire air chamber Ra is less than the first set value P1, the valve body 31 is maintained at the illustrated position, so that the suction check valve Vi permits air flow from the atmosphere into the pump chamber Ro, and the discharge check valve Vo permits air flow from the pump chamber Ro into the tire air chamber Ra. Further, the suction check valve Vi cuts off the communication between the suction-discharge path 22c and the communication path 22d and the communication between the communication path 31a and the communication path 22d to thereby restrict air flow from the pump chamber Ro to the atmosphere, and the discharge check valve Vo restricts air flow from the tire air chamber Ra to the pump chamber Ro.

Further, in the change valve 30, when the pressure of compressed air supplied from the pump chamber Ro to the tire air chamber Ra is equal to or greater than the first set value P1, the valve body 31 maintains its axial position shifted from the illustrated position by a predetermined amount, against the urging forces of the compression coil spring 32, so that the suction check valve Vi has lost its function (reverse-flow prevention function). Therefore, the suction-discharge path 22c and the communication path 31a communicate with the communication path 22d, to thereby permit air flow between the pump chamber Ro and the atmosphere. Furthermore, the discharge check valve Vo restricts air flow between the discharge path 11b and the communication path 31a; that is, between the pump chamber Ro and the tire air chamber Ra. Notably, in a state where the valve body 31 maintains its axial position shifted from the illustrated position by a predetermined amount against the urging force of the compression coil spring 32, the shoulder portion of the valve body 31 is in contact with the annular seal member 38 assembled to the sleeve 37.

The adjuster 40 includes a spring support 41 which supports the other end portion (a stationary end portion which does not move even when the valve body 31 moves) of the compression coil spring 32 of the change valve 30; and the adjustment screw 42, which can adjust the position of the spring support 41. The spring support 41 is a movable portion of a stroke sensor Sa which detects the position of the spring support 41 through conversion of the position to an electrical signal. A hemispherically protruded portion 41a of the spring support 41 is rotatably engaged with the adjustment screw 42.

The adjustment screw 42 is a member formed separately from the spring support 41, and includes a male thread portion 42a and the atmosphere communication path 42b. The male thread portion 42a of the adjustment screw 42 is screw-engaged with a female thread portion 11c of the hub 11 in such a manner as to be able to advance and retreat. The adjustment screw 42 also serves as a cap, and can be rotated from the outside of the vehicle for adjustment. A hexagonal hole 42c is formed on the outer end portion of the adjustment screw 42 such that a manually operable adjusting tool (not shown) can be removably attached thereto. Notably, a filter 43 is disposed in the atmosphere communication path 42b.

The relief valve 50 is adapted to release compressed air to the atmosphere when the pressure of compressed air supplied from the pump chamber Ro to the tire air chamber Ra; that is, the pressure within the discharge path 11b, is equal to or greater than a second set value P2 which is greater than the first set value P1. The relief valve 50 includes a valve body 51 which can open and close the relief path 22e; and a compression coil spring 52 whose one end portion (a movable end portion) is engaged with the valve body 51 and which determines the timing at which the valve body 51 moves (i.e., the timing at which the relief path 22e is opened).

The valve body 51 is installed in the cylinder head 22B via a sleeve 39 (movable together with the valve body 31 of the change valve 30) in such a manner as to be movable in the axial direction. The valve body 51 is in contact with a rod portion 45 of the stroke sensor Sa (a stationary portion of the stroke sensor Sa which can move axially in relation to the movable portion of the stroke sensor Sa with very little resistance). The other end portion (a stationary end portion) of the compression coil spring 52 is engaged with the spring support 44, which is integral with the above-described spring support 41. The urging force of the compression coil spring 52 which acts on the valve body 51 can be adjusted by means of the adjuster 40. At the time of adjustment by means of the adjuster 40, the urging force of the compression coil spring 32 which acts on the valve body 31 of the change valve 30 is adjusted simultaneously. Thus, the above-described first set value P1 and second set value P2 can be adjusted simultaneously.

This relief valve 50 is set to operate only when the pressure within the discharge path 11b becomes equal to or greater than the first set value P1. That is, when the pressure within the discharge path 11b becomes equal to or greater than the first set value P1, the change valve 30 permits air flow between the pump chamber Ro and the atmosphere and restricts air flow between the pump chamber Ro and the tire air chamber Ra, and the discharge path 11b communicates with the relief path 22e via the seal member 33. Only in such a state, the pressure within the discharge path 11b is transmitted to the relief path 22e, so that the relief valve 50 can operate.

In the air supply apparatus A of the present embodiment having the above-described structure, the change valve 30, which restricts the supply of compressed air from the pump chamber Ro of the air pump 20 to the tire air chamber Ra, is provided outside the pump chamber Ro of the air pump 20, and the adjuster 40 can adjust the timing (the first set value P1) at which the change valve 30 restricts the supply of compressed air from the pump chamber Ro of the air pump 20 to the tire air chamber Ra. Therefore, even when the above-described timing (the first set value P1) is adjusted by use of the adjuster 40, the discharge capacity of the air pump 20 does not change. Accordingly, it is possible to adjust the pressure of compressed air supplied to the tire air chamber Ra to the target value (the first set value P1), without changing the discharge capacity of the air pump 20.

Further, when the pressure of compressed air supplied from the pump chamber Ro to the tire air chamber Ra is less than the first set value P1, the change valve 30 restricts air flow from the pump chamber Ro to the atmosphere, and permits air flow from the pump chamber Ro into the tire air chamber Ra; and when the pressure of compressed air supplied from the pump chamber Ro to the tire air chamber Ra is equal to or greater than the first set value P1, the change valve 30 permits air flow between the pump chamber Ro and the atmosphere, and restricts air flow between the pump chamber Ro and the tire air chamber Ra.

As described above, when the pressure of compressed air supplied from the pump chamber Ro of the air pump 20 to the tire air chamber Ra is equal to or greater than the first set value P1, the change valve 30 permits air flow between the pump chamber Ro and the atmosphere. Therefore, the load required to drive the air pump 20 can be reduced.

Further, the change valve 30 includes the valve body 31 and the compression coil spring 32. The adjuster 40 includes the spring support 41 for supporting the other end portion (a stationary end portion) of the compression coil spring 32 and the adjustment screw 42 capable of adjusting the position of the spring support 41, and the adjustment screw 42 is formed separately from the spring support 41. This structure enables the adjustment screw 42 to be rotated in relation to the spring support 41, without transmitting rotation of the adjustment screw 42 to the compression coil spring 32 supported by the spring support 41.

In the present embodiment, there is provided the relief valve 50, which releases compressed air to the atmosphere when the pressure within the discharge path 11b is equal to or greater than the second set value P2 greater than the first set value P1. Therefore, it is possible to prevent the pressure within the discharge path 11b; i.e., the pressure within the tire air chamber Ra, from becoming excessively high. Further, the relief valve 50 is set to operate only in a state in which the change valve 30 permits air flow between the pump chamber Ro and the atmosphere and restricts air flow between the pump chamber Ro and the discharge path 11b. This structure can eliminate useless operation of the relief valve 50. Further, since the relief valve 50 is disposed inside the change valve 30, the air supply apparatus A can be made compact.

In the present embodiment, the spring support 41, which supports the compression coil spring 32 of the change valve 30, and the spring support 44, which supports the compression coil spring 52 of the relief valve 50, are integrated together. Therefore, the first set value P1 and the second set value P2 (the urging force of the compression coil spring 32 and the urging force of the compression coil spring 52) can be adjusted simultaneously by the adjuster 40, whereby the adjusting work can be simplified.

In the present embodiment, there is provided the stroke sensor Sa, which detects the positions of the spring supports 41 and 44 through conversion of position adjustment of the spring supports 41 and 44 to an electrical signal. Therefore, the positions of the spring supports 41 and 44 can be detected accurately. Further, since the stroke sensor Sa is designed to use the spring supports 41 and 44 as a movable portion of the sensor, the structure of the stroke sensor Sa can be simplified.

In the present embodiment, the air pump 20, the change valve 30, and the adjuster 40 are coaxially disposed in relation to the hub 11 (rotation shaft), which rotates together with the wheel B; and the change valve 30 is disposed between the air pump 20 and the adjuster 40. Therefore, air-tightness of the change valve 30 can be readily secured. Further, since the adjuster 40 is disposed at the furthest outboard position among the air pump 20, the change valve 30, and the adjuster 40, the adjuster 40 can be operated easily, and thus, maintainability is improved.

In the present embodiment, the air pump 20, the change valve 30, and the adjuster 40 are assembled to the hub 11, which rotates together with the wheel B; and the drive axle is coupled to the inboard end of the hub 11 for torque transmission. Therefore, the air supply apparatus A can be neatly assembled into the hub 11, which supports the wheel B and rotates together with the wheel B, whereby the hub 11 can be utilized effectively.

Figure 3:
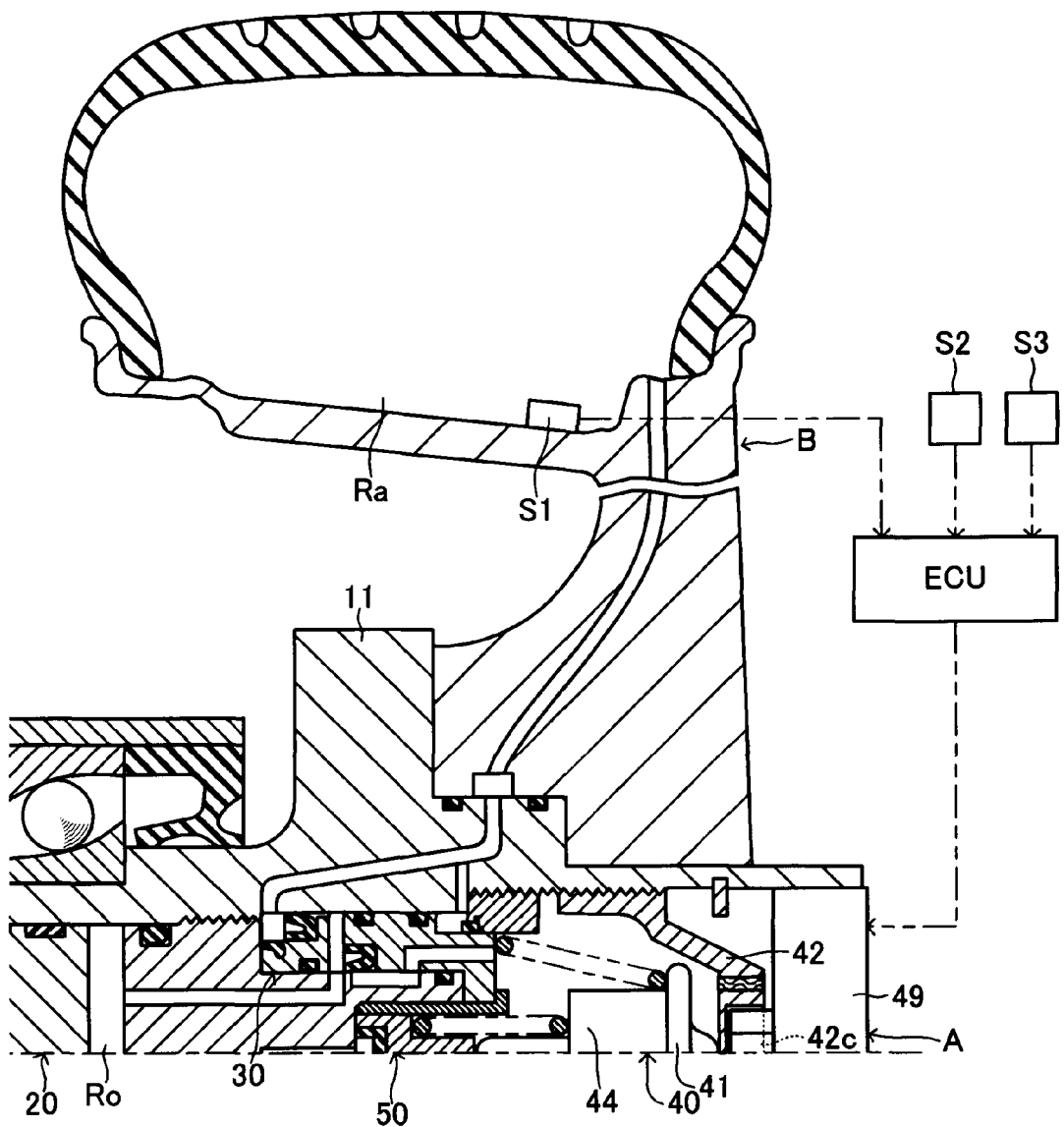
FIG. 3 is a main-portion sectional view showing another embodiment of the air supply apparatus according to the present invention.

In the above-described embodiment, the air supply apparatus is configured such that the adjustment screw 42 is axially moved by use of an adjusting tool (not shown) which can be removably attached to the hexagonal hole 42c of the adjustment screw 42 and can be operated manually. However, as in a modified embodiment shown in FIG. 3, the air supply apparatus may be configured such that the adjustment screw 42 is axially moved by means of an electric motor 49 with a speed reducer (an example electrical actuator) (the electric motor 49 is also a component of the adjustor 40).

The electric motor 49 is configured such that it is controlled by an electric control apparatus ECU so as to rotate in the regular direction or the reverse direction. The electric control apparatus ECU is connected to a sensor S1 which detects the pressure within the tire air chamber Ra, a tire-air-pressure setting device S2 which is provided near the driver's seat and allows the driver to freely set the tire air pressure, and a switch S3 which is provided near the driver's seat and is freely turned on and off by the driver. This electric control apparatus ECU is configured such that when the pressure within the tire air chamber Ra is set by means of the tire-air-pressure setting device S2, the electric control apparatus ECU controls the operation of the electric motor 49 so as to adjust the tire air pressure to the set value, and when the pressure within the tire air chamber Ra is not set by means of the tire-air-pressure setting device S2, the electric control apparatus ECU controls the operation of the electric motor 49 in accordance with the on-off operation of the switch S3.

In this case, since the above-described set values (the first set value P1 and the second set value P2) can be adjusted by operating the electric motor 49, the adjustment work can be performed through remote operation. Further, since the electric motor 49 is equipped with a speed reducer, the positions of the spring supports 41 and 44 can be finely adjusted. Therefore, fine adjustment of the positions of the spring supports 41 and 44 can be readily performed, thereby improving the accuracy of adjustment by the adjuster 40.

In the above-described embodiments, the air supply apparatus is configured such that compressed air from the air pump 20 is supplied directly to the tire air chamber Ra. However, the air supply apparatus may be configured such that compressed air from the air pump is supplied to a pressure accumulation chamber (air chamber) of an accumulator and is accumulated therein, and the compressed air accumulated in the accumulator is supplied to the tire air chamber via a control valve (which is controlled in accordance with the tire air pressure).

In the above-described embodiments, the suction check valve Vi and the discharge check valve Vo are assembled to the valve body 31 of the change valve 30. However, the present invention can be embodied such that the suction check valve Vi and the discharge check valve Vo are provided separately from the change valve 30.

The invention claimed is:

1. An air supply apparatus comprising:
   an air pump capable of supplying compressed air to an air chamber on the basis of rotation of a wheel;
   restriction means, provided outside a pump chamber of the air pump, for restricting the supply of compressed air from the pump chamber to the air chamber when the pressure of compressed air supplied from the pump chamber to the air chamber reaches a first set value;
   adjustment means for adjusting the first set value; and
   a relief valve which releases compressed air to the atmosphere when the pressure of compressed air supplied from the pump chamber to the air chamber is equal to or greater than a second set value greater than the first set value,
   wherein the restriction means is a change valve configured such that when the pressure of compressed air supplied from the pump chamber to the air chamber is less than the first set value, the change valve restricts air flow from the pump chamber to the atmosphere, and permits air flow from the pump chamber into the air chamber,
   wherein when the pressure of compressed air supplied from the pump chamber to the air chamber is equal to or greater than the first set value, the change valve permits air flow between the pump chamber and the atmosphere, and restricts air flow between the pump chamber and the air chamber, and
   wherein the adjustment means can adjust the first set value and the second set value simultaneously.

2. The air supply apparatus according to claim 1, wherein the change valve includes a valve body which is movably assembled to a passageway communicating with the pump chamber and the air chamber and controls air flow in accordance with a moved position; and a spring which has a movable end portion in engagement with the valve body and is capable of controlling the moved position of the valve body, wherein an urging force applied from the spring to the valve body is adjusted by the adjustment means.

3. The air supply apparatus according to claim 2, wherein the adjustment means includes a spring support for supporting a stationary end portion of the spring, and a screw mechanism for adjusting the position of the spring support.

4. The air supply apparatus according to claim 3, wherein the screw mechanism includes an adjustment screw which can advance and retreat and which is formed separately from the spring support.

5. The air supply apparatus according to claim 3, wherein the, adjustment means includes a speed-changing mechanism capable of finely adjusting the position of the spring support.

6. The air supply apparatus according to claim 1, wherein the relief valve is set to operate only in a state in which the change valve permits air flow between the pump chamber and the atmosphere and restricts air flow between the pump chamber and the air chamber.

7. The air supply apparatus according to claim 6, wherein the relief valve is disposed inside the change valve.

8. The air supply apparatus according to claim 1, wherein a first spring support supporting a stationary end portion of a first spring, which is a component of the change valve, and another spring support supporting a stationary end portion of a second spring, which is a component of the relief valve, are integrated together.

9. The air supply apparatus according to claim 3, further comprising detection means for converting position adjustment of the spring support into an electrical signal, the adjustment being performed by means of the screw mechanism.

10. The air supply apparatus according to claim 9, wherein the detection means is a stroke sensor which detects the position of the spring support.

11. The air supply apparatus according to claim 10, wherein the stroke sensor is configured to use the spring support as a movable portion of the sensor.

12. The air supply apparatus according to claim 1, wherein the adjustment means includes an electrical actuator, whose operation is controlled by an electric controller.

13. The air supply apparatus according to claim 1, wherein the air pump, the restriction means, and the adjustment means are coaxially disposed in relation to a rotation shaft which rotates together with the wheel.

14. The air supply apparatus according to claim 13, wherein the restriction means is disposed between the air pump and the adjustment means.

15. The air supply apparatus according to claim 13, wherein the adjustment means is disposed at the furthest outboard position away from the rotation shaft.

16. The air supply apparatus according to claim 1, wherein the air pump, the restriction means, and the adjustment means are assembled to a hub which rotates together with the wheel, with a drive axle coupled to the hub such that torque can be transmitted from the drive axle to the hub.

* * * * *